March 18, 1930.　　J. V. RAWLINGS　　1,750,860
GOLD SEPARATOR
Filed June 8, 1929　　3 Sheets-Sheet 1

INVENTOR
Jack V. Rawlings
BY
F. P. Goin
ATTORNEY

March 18, 1930.  J. V. RAWLINGS  1,750,860
GOLD SEPARATOR
Filed June 8, 1929  3 Sheets-Sheet 3

INVENTOR
Jack V. Rawlings
BY
ATTORNEY

Patented Mar. 18, 1930

1,750,860

UNITED STATES PATENT OFFICE

JACK V. RAWLINGS, OF SEATTLE, WASHINGTON, ASSIGNOR TO EDMOND M. BEUS, TRUSTEE, OF SODA SPRINGS, IDAHO

GOLD SEPARATOR

Application filed June 8, 1929. Serial No. 369,458.

This invention relates to ore separators, particularly those pertaining to the separation of gold where the ore is pulverized and has been sluiced off with water.

The principal object of the invention is to provide a separator which will separate the gold from the mixture and will also separate out the lead, silver, etc., from the tailings.

A further object of the invention is the provision of means for collecting these ores separately and for also passing off the tailings.

A further object is to provide a means for collecting the gold up to a predetermined weight and then automatically discharging same into a collecting receptacle.

A still further object is to provide a means whereby the base ore concentrates, such as lead, silver, etc., are put through a double process to insure thoroughness of operation.

The invention is illustrated in the accompanying drawings, in which.

Figure 1:
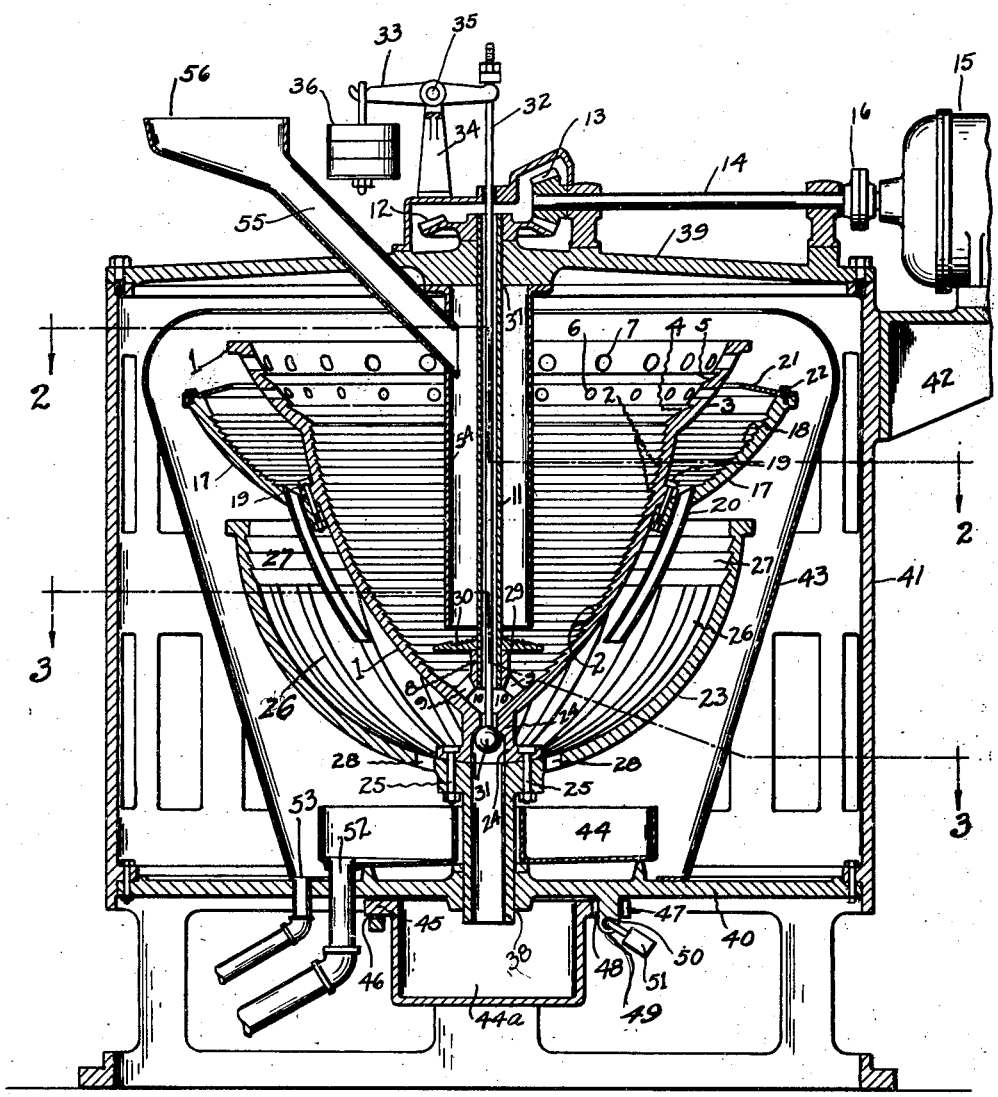
Figure 1 is a vertical section of the entire machine.
Figure 2:
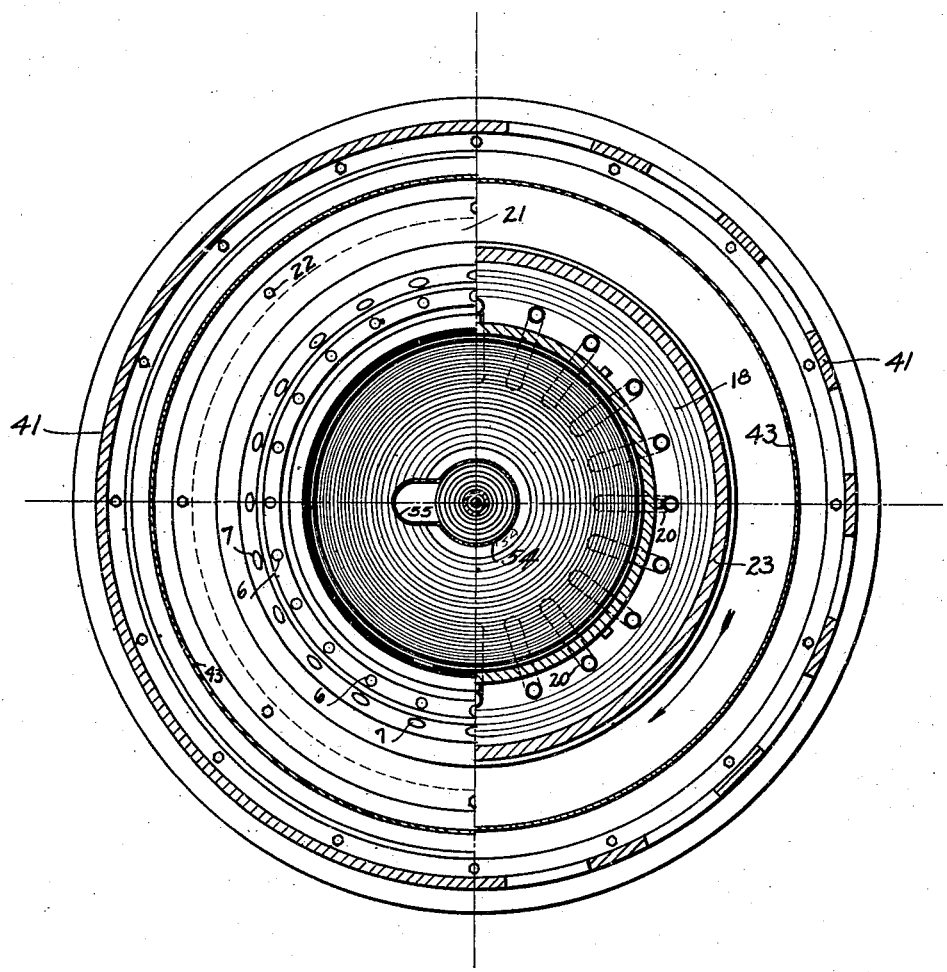
Figure 2 is a sectional view taken upon the line 2—2 of Figure 1.

This device consists of three bowls fastened together so as to form one unit. The inner bowl is provided with a series of horizontal riffles 2. The upper section 3 of the bowl flares out more rapidly, said section being provided with larger riffles 4 and 5 alternating with series of holes 6 and 7. The lower part of the bowl has a hub 8 which has a series of holes 9 and a bottom outlet 10.

Rigidly attached to the hub 8 is a hollow shaft 11, the top of the shaft being provided with a bevel gear 12 meshing with a bevel pinion 13. The bevel pinion is fastened to a shaft 14 which is coupled to the motor 15 by a coupling 16. Another bowl 17 provided with horizontal riffles 18 is rigidly attached to the bowl 1 by means of bolts 19. The bottom of this bowl is provided with a series of copper tubes, as shown at 20. Secured by screws 22 to the top of this bowl is a baffle ring 21, the edge of the ring covering the outlets of the holes 6, whereby the second bowl 17 receives the contents of bowl 1 discharged through opening 6.

Figure 3:
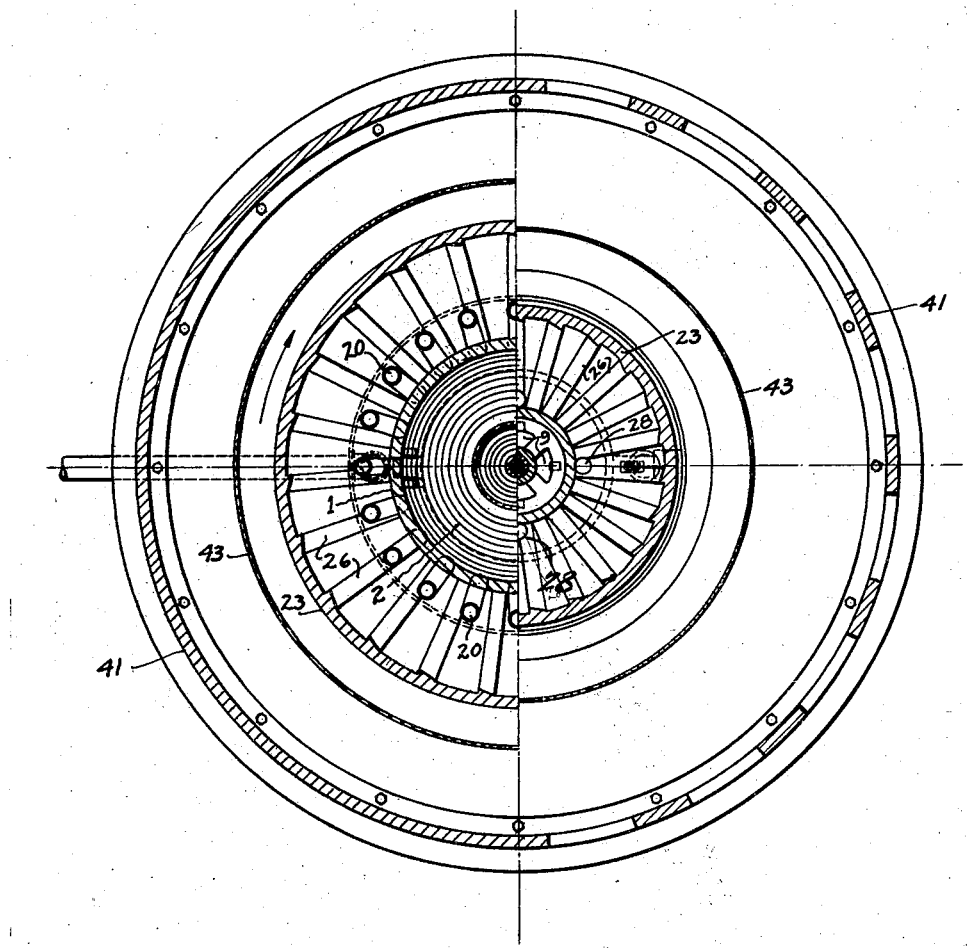
Figure 3 is a sectional view taken at line 3—3 of Figure 1.

A third bowl 23 is attached to an extension 24 of the bowl 1 by means of bolts 25. This bowl is provided with a series of vertical riffles 26 and horizontal riffles 27. The bottom is provided with a series of holes 28 (see Figures 1 and 3). Attached to the hub 8 of the bowl 1 is a distributing plate 29, provided with concentric riffles 30. The hole 10 of the bowl 1 is normally held closed by a ball 31 connected to a rod 32, which is urged upwardly by the right hand end of a lever 33 which is pivoted to a bracket 34 at the point 35. The left hand end of the lever 33 is provided with a series of weights 36, the number of which may be varied to get the required lift of the ball 31.

The three bowls as one unit with the shaft 11 are rotatably mounted at 37 and 38 in the top and bottom covers 39 and 40 of the main frame 41 of the machine. 42 is a bracket attached to the frame 41 for supporting the motor 15. 43 is a hopper, preferably of sheet metal, surrounding the bowls and secured to the bottom plate 40. 44 is a pan mounted below the bowl 23 and resting on the cover 40. 44ª is another pan which is suspended from the lower side of the cover 40. The pan is provided with a pin 45 which passes through a loop 46 suspended from the plate 40. The other side of the box is provided with a lug 47 containing an aperture 48, passing over the lug 49 which is integral with the plate 40. This lug is provided with a hole 50 through which a lock 51 can be passed to secure the pan 44ª to the bottom of the machine. 52 is a pipe connected to the pan 44, and 53 is another pipe passing through the plate 40, terminating in hopper 43. 54 is a feed pipe surrounding the shaft 11 and secured to the bottom of the top plate 39. 55 is another tube provided with a hopper 56. This tube passes through the cover 39 and empties into the feed pipe 54.

The operation is as follows:

The pulverized ore and water is fed into the hopper 56, through the tube 55 and into the tube 54 down onto the plate 29. The mixture of ore and water is now agitated and thrown off, due to centrifugal force. As the mixture is thrown off, the different substances, due to their specific gravity, are separated, the heaviest particles, such as gold, being thrown out the farthest and thrown into the lower riffles 2 of the bowl 1. The particles of gold in these riffles, being free, have a greater specific gravity than that of the mixture, tend to overcome the centrifugal force at this point and start going down the lower riffles, through the holes 9 and into the chamber and hole 10 where they can be drawn off by depressing ball 31 and caught in the pan 44ª. If desired, the weights 36 may be so adjusted that a predetermined weight of gold will depress the ball and automatically be emptied into the pan 44ª.

The tailings climb upward very readily. Base ore concentrates (lead, silver, etc.) are also separated, but their specific gravity not being sufficient to overcome the centrifugal force, are gradually worked upward past the riffles 2 of the bowl 1 and up through the holes 6 and into the bowl 17 at the top of the bowl 1 where the centrifugal force is greater and the tailings are thrown over the top. Slime and pulp, being sluggish and slightly heavier than tailings, pass through the hole 7, forming a suction which tends to pull all slime and tailings with it.

Base ore collects in the bowl 17 and is thoroughly agitated. When the riffles in the bowl 17 are full, heavier particles drop to the bottom through copper tubes 20 and into the bowl 23. As the bowl 17 fills up with water and base ore, lighter particles rise out over the baffle ring 21, the action being similar to flotation process, suction taking place over the ring instead of employing compressed air as used in the present flotation process. These lighter particles or tailings empty into the hopper 43 and are carried away through the pipe 53.

Base ore, when leaving the copper tubes 20, is thrown straight out into vertical riffles 26 of the bowl 23. This bowl has the same action as that of gravity concentrator, the heavier particles staying in the vertical riffles and the lighter particles and tailings passing over the top. The horizontal riffles 27 collect the remainder of the concentrates or concentrates of low specific gravity, the tailings passing into the hopper 43 and out through the pipe 53. The holes 28 in the bottom of the bowl 23 allow the concentrates to pass through when the riffles 27 are full and into the pan 44. The concentrates collecting in this pan are those ready for the smelter and may be drawn out through the pipe 52.

What is claimed to be new is:

1. A centrifugal separator comprising an inner bowl having a flared upper section, said section having two series of holes, horizontal riffles formed on the lower section, an intermediate bowl carried by the inner bowl, said inner bowl discharging through one series of holes into the intermediate bowl, discharge tubes extending downwardly from said intermediate bowl, an outer bowl receiving discharge from the tubes, and hoppers receiving the retained contents of the bowls.

2. A centrifugal separator comprising an inner bowl having a flared upper section, said section having two series of holes, horizontal riffles formed on the lower section, a delivery tube extending into said inner bowl, an intermediate bowl carried by the inner bowl, said inner bowl discharging through one series of holes into the intermediate bowl, discharge tubes extending downwardly from said intermediate bowl, an outer bowl receiving discharge from the tubes, and hoppers receiving the retained contents of the bowls.

3. A centrifugal separator comprising an inner bowl having a flared upper section, said section having two series of holes, horizontal riffles formed on the lower section, a delivery tube extending into said inner bowl, a receiving plate carried by the inner bowl directly under the delivery tube, an intermediate bowl carried by the inner bowl, said inner bowl discharging through one series of holes into the intermediate bowl, discharge tubes extending downwardly from said intermediate bowl, an outer bowl receiving discharge from the tubes, and hoppers receiving the retained contents of the bowls.

4. A centrifugal separator comprising an inner bowl having a flared upper section, said section having two series of holes, horizontal riffles formed on the lower section, a delivery tube extending into said inner bowl, a receiving plate having concentric riffles carried by the inner bowl directly under the delivery tube, an intermediate bowl carried by the inner bowl, said inner bowl discharging through one series of holes into the intermediate bowl, discharge tubes extending downwardly from said intermediate bowl, an outer bowl receiving discharge from the tubes, and hoppers receiving the retained contents of the bowls.

5. A centrifugal separator comprising an inner bowl having a flared upper section, said section having two series of holes, horizontal riffles formed on the lower section, a delivery tube extending into said bowl, a receiving plate having concentric riffles carried by the inner bowl directly under the delivery tube, an intermediate bowl carried by the inner bowl receiving the contents of the inner bowl discharged through one series of holes, a cover plate for the intermediate bowl, an outer bowl, discharge tubes extending from the intermediate bowl into the outer bowl, horizontal riffles formed on the upper section of the outer bowl, vertical riffles formed on the lower section of the outer bowl, an outer hopper entirely surrounding the bowls, and other hoppers receiving the retained contents of the inner and outer bowls.

6. A centrifugal separator comprising an inner bowl having a flared upper section, said section having two series of holes, horizontal riffles formed on the lower section, a delivery tube extending into said bowl, a receiving plate having concentric riffles carried by the inner bowl directly under the delivery tube, an intermediate bowl carried by the inner bowl receiving the contents of the inner bowl discharged through one series of holes, a cover plate for the intermediate bowl, an outer bowl, discharge tubes extending from the intermediate bowl into the outer bowl, horizontal riffles formed on the upper section of the outer bowl, vertical riffles formed on the lower section of the outer bowl, an outer hopper entirely surrounding the bowls, other hoppers receiving the retained contents of the inner and outer bowls, and means for automatically discharging a predetermined weight of gold from the inner bowl into its hopper.

In testimony whereof I affix my signature.

JACK V. RAWLINGS.